(12) United States Patent
Hewitt et al.

(10) Patent No.: US 9,167,380 B2
(45) Date of Patent: *Oct. 20, 2015

(54) ACTIVATING A MOBILE DEVICE BASED ON LOCATION OF MOBILE DEVICE IN A SECTOR OF A CELL

(71) Applicant: International Business Machines Corporation, Armonk, NY (US)

(72) Inventors: Trudy Leigh Hewitt, Cary, NC (US); Francesco Carmine Schembari, Durham, NC (US); Christina Lynn Wetli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,944

(22) Filed: Nov. 5, 2013

(65) Prior Publication Data

US 2014/0213286 A1 Jul. 31, 2014

Related U.S. Application Data

(63) Continuation of application No. 13/753,170, filed on Jan. 29, 2013.

(51) Int. Cl.
*H04W 24/00* (2009.01)
*H04W 4/02* (2009.01)
*H04W 64/00* (2009.01)
*H04L 29/08* (2006.01)

(52) U.S. Cl.
CPC ............... *H04W 4/02* (2013.01); *H04W 4/023* (2013.01); *H04W 4/026* (2013.01); *H04W 24/00* (2013.01); *H04W 64/003* (2013.01); *H04L 67/06* (2013.01)

(58) Field of Classification Search
CPC ....... H04W 64/00; H04W 4/02; H04W 24/00; H04W 64/003
USPC .......... 455/456.1, 456.2, 456.3, 456.4, 456.5, 455/456.6, 457
See application file for complete search history.

(56) References Cited

U.S. PATENT DOCUMENTS

| | | | |
|---|---|---|---|
| 6,823,188 B1 | 11/2004 | Stern | |
| 6,904,363 B2 | 6/2005 | Inbar et al. | |
| 7,024,228 B2 | 4/2006 | Komsi et al. | |
| 7,155,166 B2 | 12/2006 | Swan | |
| 7,783,299 B2 | 8/2010 | Anderson et al. | |
| 7,831,199 B2* | 11/2010 | Ng et al. | 455/3.06 |
| 8,229,421 B2* | 7/2012 | Hotes et al. | 455/432.1 |
| 8,271,655 B2 | 9/2012 | Dawson et al. | |
| 8,412,237 B1 | 4/2013 | Ohme | |
| 8,447,265 B2 | 5/2013 | Flippo et al. | |
| 2010/0332818 A1 | 12/2010 | Prahlad et al. | |

(Continued)

*Primary Examiner* — Nathan Mitchell
*Assistant Examiner* — Sayed T Zewari
(74) *Attorney, Agent, or Firm* — Parashos T. Kalaitzis; Robert C. Rolnik

(57) ABSTRACT

A method for activating mobile device activity is disclosed. A mobile device may receive an action association to a stance, wherein the stance comprises a sector of the mobile device relative to a base, wherein a user specifies an action associated to the stance. The mobile device can receive a signal that the mobile device is present in the sector. Further, the mobile device, responsive to receiving the signal, may perform the action.

6 Claims, 5 Drawing Sheets

(56) References Cited

U.S. PATENT DOCUMENTS

| | | |
|---|---|---|
| 2011/0138050 A1 | 6/2011 | Dawson |
| 2011/0153727 A1 | 6/2011 | Li |
| 2011/0256886 A1 | 10/2011 | Velusamy |
| 2011/0276686 A1 | 11/2011 | Tung et al. |
| 2012/0066670 A1 | 3/2012 | McCarthy et al. |
| 2013/0150028 A1* | 6/2013 | Akins et al. .................. 455/427 |
| 2013/0173315 A1 | 7/2013 | Dorsey |
| 2013/0203442 A1 | 8/2013 | Le Blanc et al. |

* cited by examiner

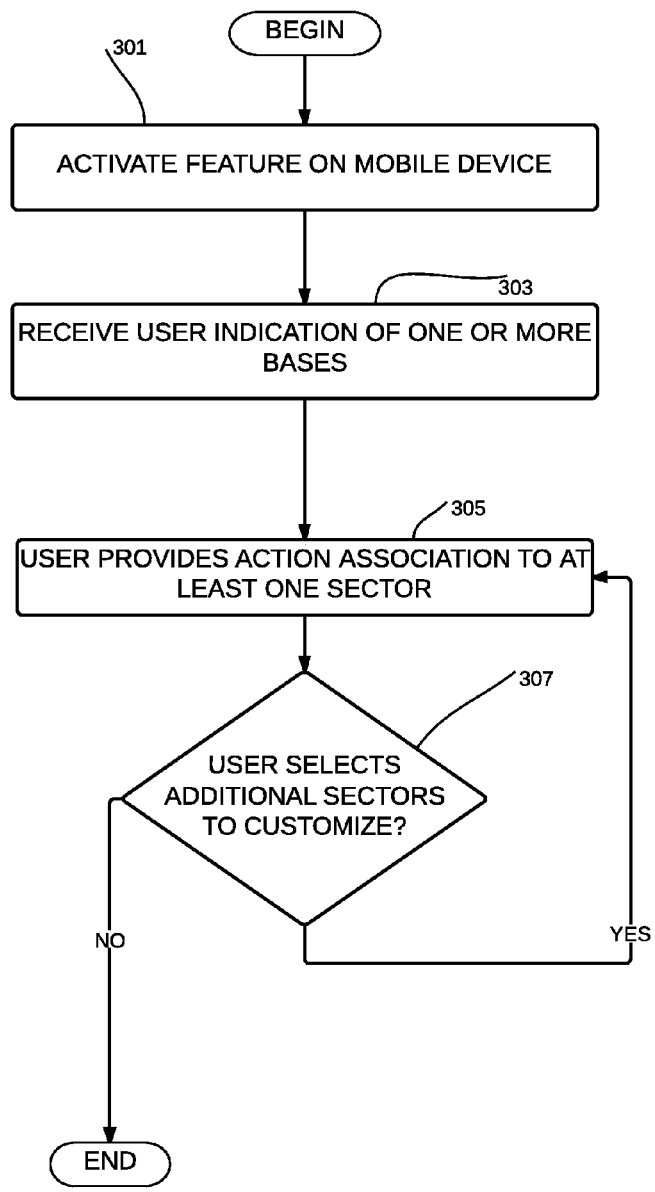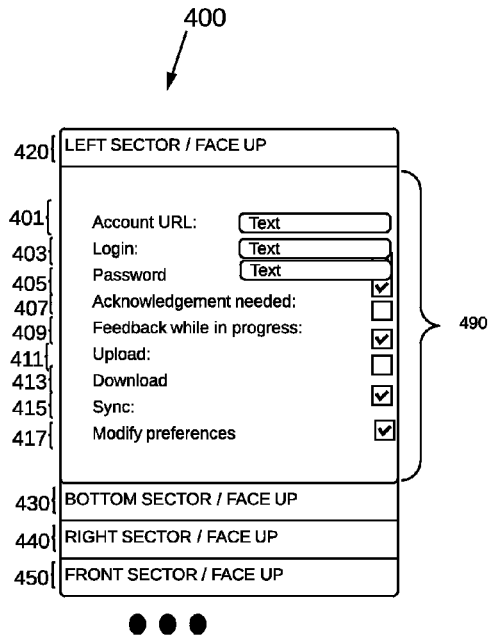

ACTIVATING A MOBILE DEVICE BASED ON LOCATION OF MOBILE DEVICE IN A SECTOR OF A CELL

The present invention is a continuation to parent U.S. patent application Ser. No. 13/753,170, filed Jan. 1, 2013, entitled "DIRECTION COUPLING DISCRIMINATION OF NETWORKED EXCHANGES", priority to which is claimed. The present invention relates to a method for inducing activity in a mobile device based on its position and/or orientation and more specifically to activating communications to cloud services in response to position on or near a base station.

BACKGROUND

Users of mobile devices periodically desire to upload data from such devices to more permanent and durable storage. Frequently, product designers will provide for only the lowest power wireless transmittal of this data in order to conserve usage from small batteries that can be used in these applications. Moreover, multipurpose devices, such as smart phones, can have multiple types of data, for example, audio content, video content, pictures.

However, some users can have preferences as to the type of data that may be exchanged during these times of relative immobility of the mobile device, as can occur, for example, when having an evening meal. Nevertheless, a typical usage scenario requires a user to actively select files to exchange when making such exchanges. It is desirable to remove the effort a of a user in selecting files and perform other operations with a mobile device when the user spontaneously places the device in its relatively immobile place.

An alternative method and or equipment may improve things.

SUMMARY

According to one embodiment of the present invention a computer implemented method for activating mobile device activity is disclosed. A mobile device may receive an action association to a stance, wherein the stance comprises a sector of the mobile device relative to a base, wherein a user specifies an action associated to the stance. The mobile device can receive a signal that the mobile device is present in the sector. Further, the mobile device, responsive to receiving the signal, may perform the action.

BRIEF DESCRIPTION OF THE SEVERAL VIEWS OF THE DRAWINGS

FIG. 3 is a flowchart of steps to configure the mobile device to cooperate with the base unit in accordance with an illustrative embodiment of the invention;

FIG. 4 is an exemplary user interface used to collect action associations to a sector in accordance with an illustrative embodiment of the invention;

DETAILED DESCRIPTION

Figure 1:
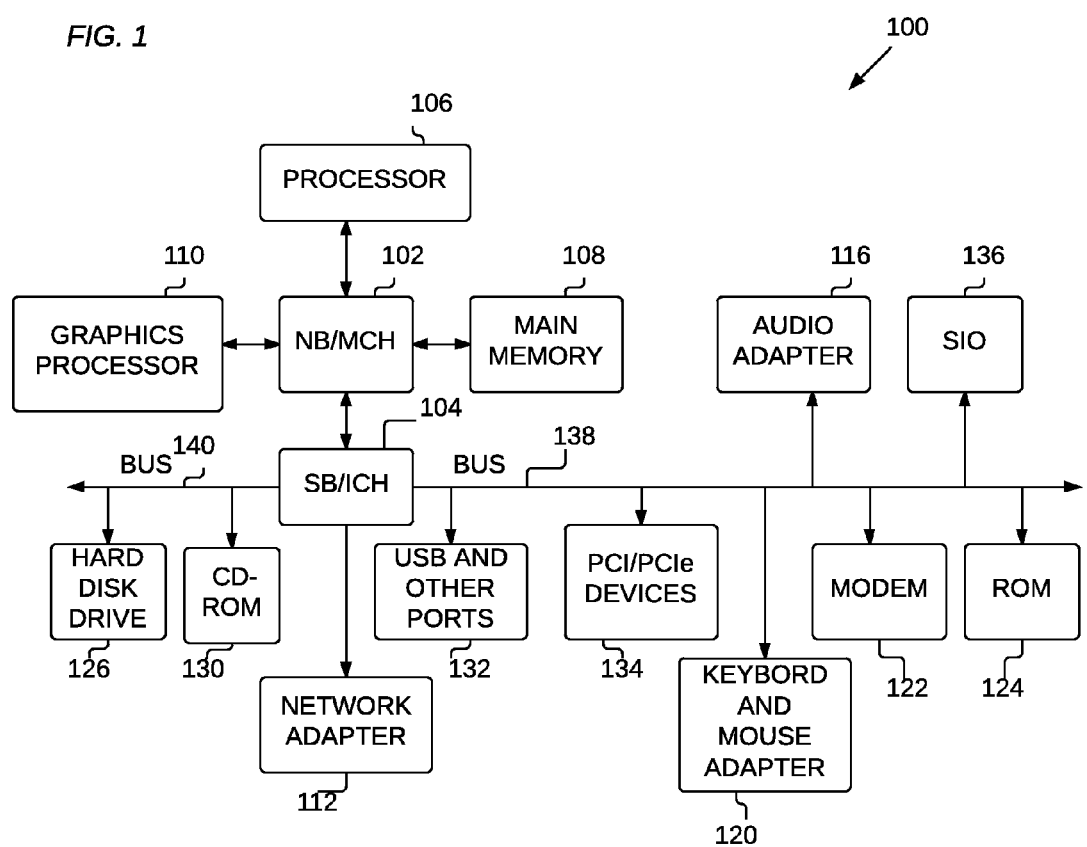
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the embodiments can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable storage device(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible storage device that can store a program for use by or in connection with an instruction execution system, apparatus, or device. The term "computer-readable storage device" does not encompass a signal propagation media such as a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage device that can direct a computer, other programmable data processing apparatus, or other devices to function in a particular manner, such that the instructions stored in the computer readable storage device produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments described herein may allow a user to previously establish a stance or station of a mobile device that is used to activate at least one among several actions. Actions can include, for example, exchanging data to a cloud computing node; exchanging data to a node in a LAN to which the mobile device is attached; reconfiguring the visibility of applications in the mobile device's user interface, among others. Accordingly, a user can activate, by mere placement of mobile device, the initiation and/or conclusion of an action based on proximity, location and/or posturing of the mobile device relative to a base.

Figure 2:
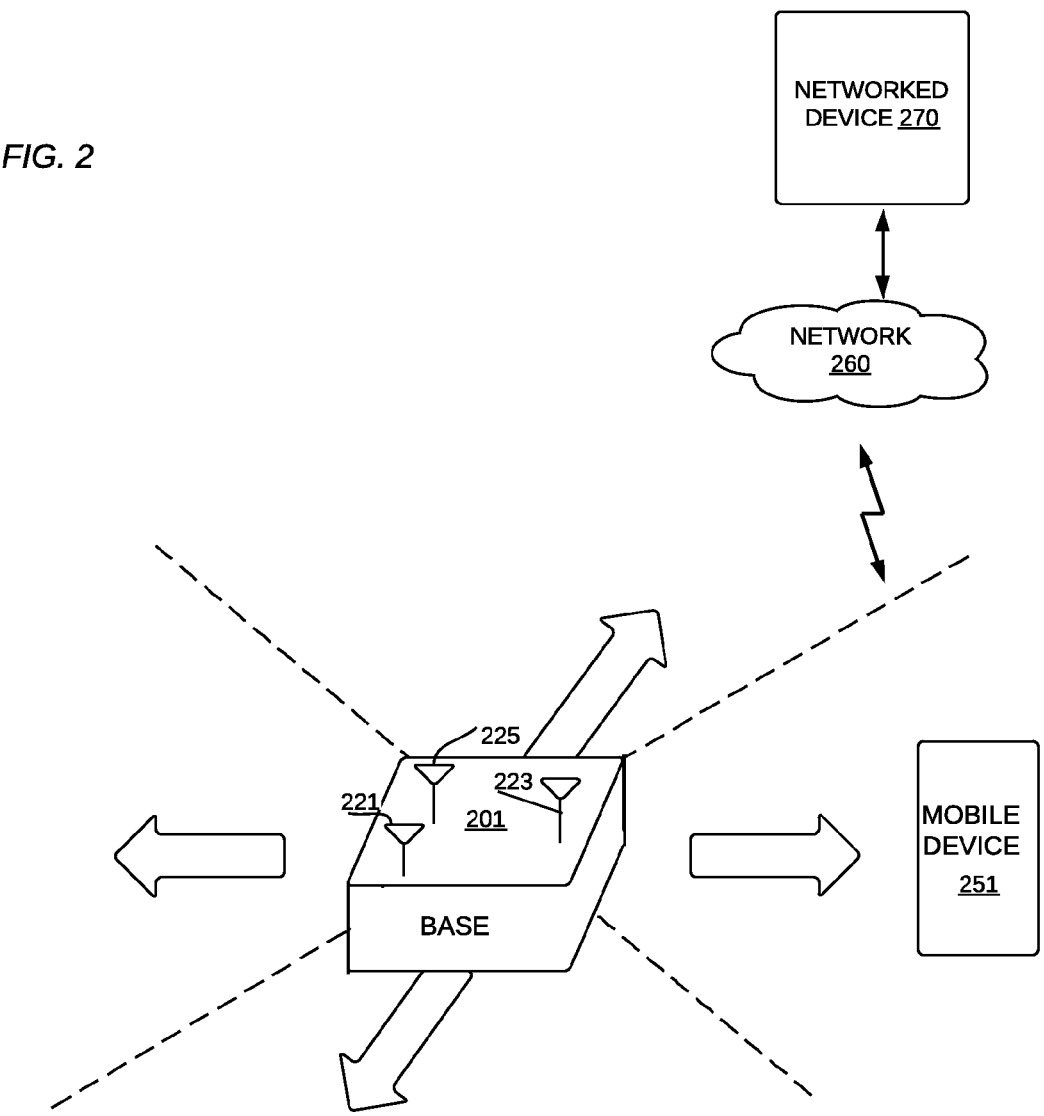
FIG. 2 is a spatial relationship diagram of a base unit and a mobile device in accordance with an illustrative embodiment of the invention.

FIG. 2 is a spatial relationship diagram of a base unit and a mobile device in accordance with an illustrative embodiment of the invention. A base unit, or base, is a data processing system having at least one sensor by which the base is able to determine a relative location of a mobile device relative to the base. A base may be configured, for example, to include one or more devices of the data processing system 100. As such, the base can operate as a bulk storage device on which to offload data files of one or more mobile devices as a kind of rudimentary network attached storage. A mobile device is a data processing system having at least radio communications features such as by cellular band data communication; wi-fi or Bluetooth, among others. A mobile device may be implemented, for example, in a tablet, smart-phone or other portable electronic devices, and can implement one or more of the components of a data processing system such as data processing system 100. Nevertheless, it is appreciated that suitable substitutes for bulkier components, such as the keyboard and mouse adapter 120 can be accomplished through, for example, a touch screen or audio/voice interface. As such, the mobile device can be more pocket-friendly than the base.

A base can be base 201, which may support plural antennas used to obtain location information though use of triangulation. Antennas can be positioned in diverse locations, for example antenna 221, antenna 223, and antenna 225. Such antennas may be sampled for signal strength of wi-fi packets transmitted from a mobile device, such as mobile device 251. Accordingly, the base can determine, for the mobile device, which among several sectors the mobile device transmits from. It is appreciated that antennas are just one form that sensors within the base may take to detect relative position of nearby objects. Another alternative to radio sensors is to use image sensors, such as PixArt CMOS image sensors. As such, an image sensor can detect which among at least two sectors that a mobile device is placed. For purposes of further discussion, base 201 can distinguish between five sectors, namely, front, left, rear and right of the base, as well as above the base. Correspondingly, the mobile device will be registered to one of these locations, allowing for ambiguity resolution when the mobile is at a boundary between sectors.

FIG. 3 is a flowchart of steps to configure the mobile device to cooperate with the base unit in accordance with an illustrative embodiment of the invention. Initially, a mobile device receives a user input, which causes the mobile device to activate the feature on the mobile device (step 301). Next, the mobile device may receive a user indication of one or more bases (step 303). The user indication can be, for example, providing a unique identifier of the base. Alternatively, the mobile device may be able to identify a base as being the only detectable base. In which case, a user can simply confirm that the detectable base is the base which the user indicates. As such, the mobile device can store the base identity as an authorized base which may be used to coordinate further actions. It is appreciated that multiple mobile devices can implement the flowchart of FIG. 3 with respect to a particular base.

Next, the base may receive an action association to at least one stance. A stance is the location of the mobile device relative to the base and/or the orientation of the mobile device. The orientation can be in relation to an apparent force of gravity. An apparent force of gravity can be the force of gravity, combined with forcing consistent with changes in altitude and/or velocity. An orientation the signal or force detected from be a sensor arrangement that can operate as a proxy for gravity and/or the direction the mobile device faces. Such a sensor arrangement can be, for example, a mobile device having two cameras that face opposing directions, whereby detecting occultation of the one lens signals a stance that may be down in the direction the lens faces. As such, the base receives at least an action association to at least one sector (step 305). A mobile device typically has two broad sides, one of which is the chief source for visual data, for example a largest display screen. The side having such a display screen is visible when the opposing broad side is facing downward, or is leaning at an angle that the surface normal to the opposing broad side is within 50° of pointing down. In such an orientation, the mobile device is described as 'up'. Conversely, when the surface normal of the largest display screen is within 50° of pointing down, the mobile device is described as 'down'. A sector of the mobile device relative to a base is a space within 10 meters of the base, that is distinguishable from neighboring spaces. The action that is associated to the stance is described in further detail in reference to FIG. 4, explained below. Many practical applications of the base can detect sectors while the base is within a few feet of the base.

Next, the mobile device may determine that the user selects additional sectors to customize (step 307). If the determination is positive, step 305 is repeated with respect to a different sector or stance. However, if the determination is negative, processing may terminate. At this point, the mobile device has the identity of at least one base with which it may determine a stance. Further, the mobile device has stored action associations to at least one sector. The action associations for a sector may distinguish a first action which is responsive to the mobile device facing up, and a second action which is responsive to the mobile device facing down.

FIG. 4 is an exemplary user interface used to collect action associations to a sector in accordance with an illustrative embodiment of the invention. User interface 400 may appear, for example, on the face of a smart phone. The user may select sectors that the user wants to associate with specific actions by selecting panels 420, 430, 440 and 450 that may expand to reveal specific user interfaces that solicit details from the user, for example, at sub-panel 490. Each such panel may correspond, at least when a user selects it, to a user selecting additional sectors to customize as shown at step 307, above. It is appreciated that further sectors can be selected in interfaces similar to 450, such as, for example, "LEFT SECTOR/FACE DOWN", with corresponding user options to select specific action or actions in response to the corresponding stance. For example, 10 stances can be selectable that correspond to four cardinal directions plus placement atop the base, combined with a facing orientation of up or down. As such, a user using such an embodiment can establish up to 10 actions to perform in response to later establishing the mobile device in one of the 10 stances.

As part of the action association received at step 305, the mobile device may prompt the user for information regarding user login 403 and user password 405. A user password can be a string known to the user and stored also to the mobile device, in plaintext or encrypted form. Further, the user can provide service resolution parameters through prompt 401, for example, a user can identify a universal resource locator (URL). A service resolution parameter can be in several forms, including receiving a partial URL, and disambiguating the URL, as well as receiving a Quick Response (QR) code that provides the equivalent of an URL or partial URL. The action can be communicating to a networked device other than the base. The networked device can be networked device 270 of FIG. 2.

Further details concerning the action can be collected from a user at this time. For example, a user may indicate that the user must acknowledge a mobile device's determination of stance selection at checkbox 407. The acknowledgement is any user inputs that confirm the action to be taken. The acknowledgment can be a touch to an active touch sensor or a spoken response. As such, the touch input can be in response to a rendered prompt. Accordingly, when a user has selected the acknowledgement option, a user can avoid inadvertent uploads that may unintentionally be activated by dragging the mobile device through an unwanted sector prior to dropping the device into the desired sector. Further a user may desire some form of feedback that an action is progressing. As such the user may enter such a choice at checkbox 409. In response to action activating, explained in FIG. 6, below, the mobile device may render data files such that a user can see the data that is progressing.

Additional details concerning the action may be collected. A user may indicate that an upload of recently collected files of the mobile device should occur at checkbox 411. In addition, the user can indicate a preference to download recently collected files at checkbox 413. A user can indicate a desire to synchronize data between the mobile device and a cloud device using checkbox 415. Alternatively, the operation of the base may be such that it operates as a final storage place for synced data, even if only temporarily. Yet another form of action can be the user's desire that the preferences of a mobile device be changed in some way at checkbox 417. This final preference can be an indication that the mobile device should switch to a secondary configuration of a device, such as, for example, operate in silent mode, or hide media and/or applications that are not suitable for child access. User preferences entered through user interface 400 can be stored to non-volatile storage of the mobile device. Synchronizing, or 'syncing', can comprise uploading data from the mobile device to another device.

Figure 5:
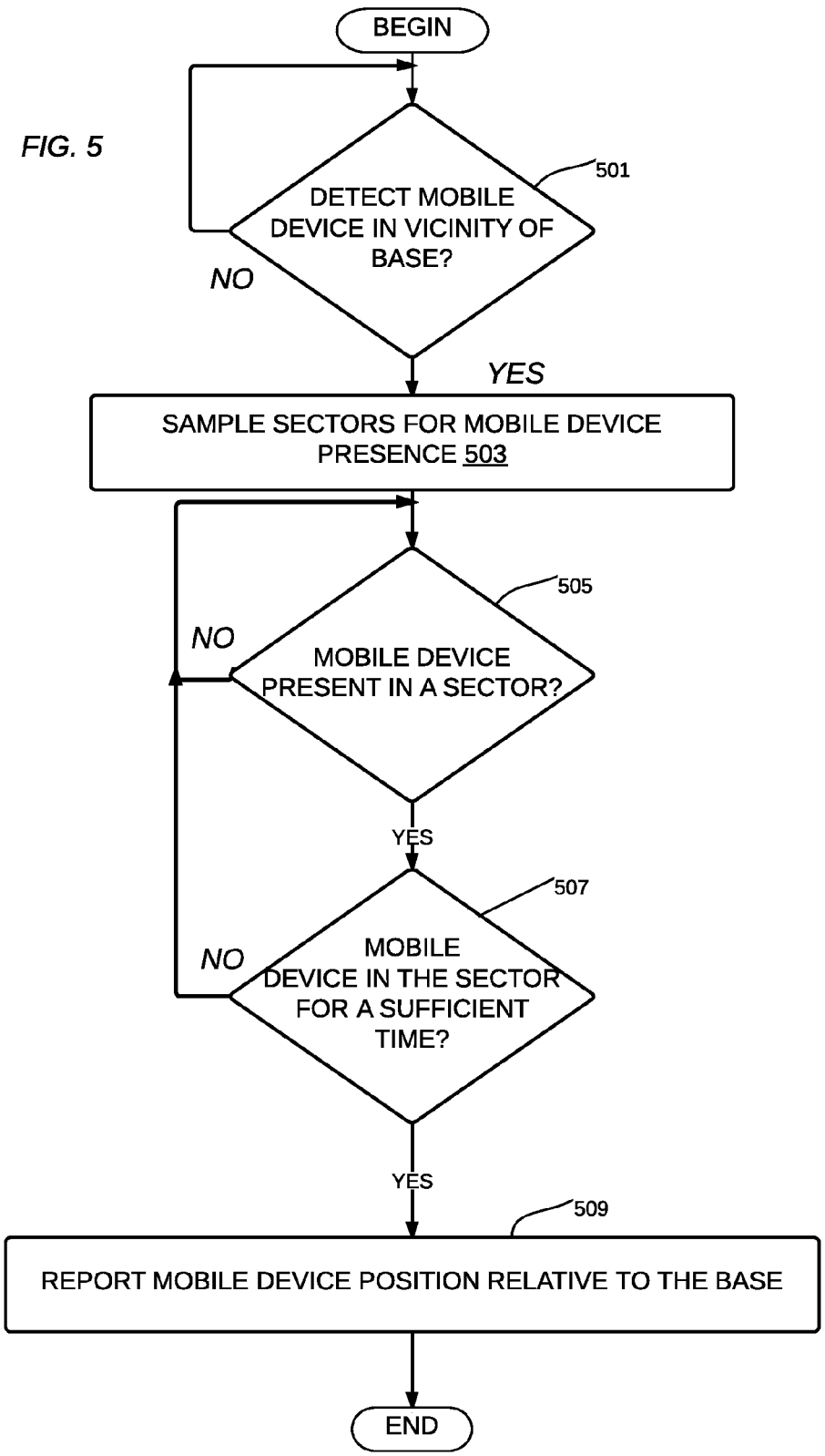
FIG. 5 is a flowchart showing base unit cooperation to indicate mobile device sector location in accordance with an illustrative embodiment of the invention.

In addition, further criteria may be set to limit the data uploaded or synced. For example, some illustrative embodiments can additionally collect tags from a user, wherein the tag can operate as a matching criteria to select data or media files that are tagged with the same tag FIG. 5 is a flowchart showing base unit cooperation to indicate mobile device sector location in accordance with an illustrative embodiment of the invention. The flowchart of FIG. 5 can be operated once user choices and identification of a base is performed, as in, for example, the flowchart shown in FIG. 3, above. Initially, the base may detect a mobile device in the vicinity of the base (step 501). If no mobile device is detected, the base may repeatedly perform step 501. Alternatively, a detection of the mobile device can cause the base to sample sectors for mobile device presence (step 503).

Next, the base can determine if the mobile device is present in a sector (step 505). While the mobile device is not established to a sufficient degree of certainty in a sector, the base may repeatedly perform step 505. Step 505 determines that a mobile device is in field of view of at least one sensor. The sensor or sensors may make the determination using electromagnetic signals such as, for example, radio, infrared or optical signals. However, if the base can determine a sector that the mobile device is in, the base may determine whether the mobile device is in the sector for a sufficient time (step 507).

Next, the base may report the mobile device position relative to the sensor (step 509). The report can be transmitted using signaling, such as, for example, Bluetooth, wi-fi, and other radio standards. Such a report can include an identity of the sensor, which may include an identity of the base. As such, indicating stance can include reporting further comprises transmitting the identity of the sensor. The identity of the sensor can be a serial number, or a English description coupled to the identity of the base. Further details of the report can include the identity of the mobile device.

Figure 6:
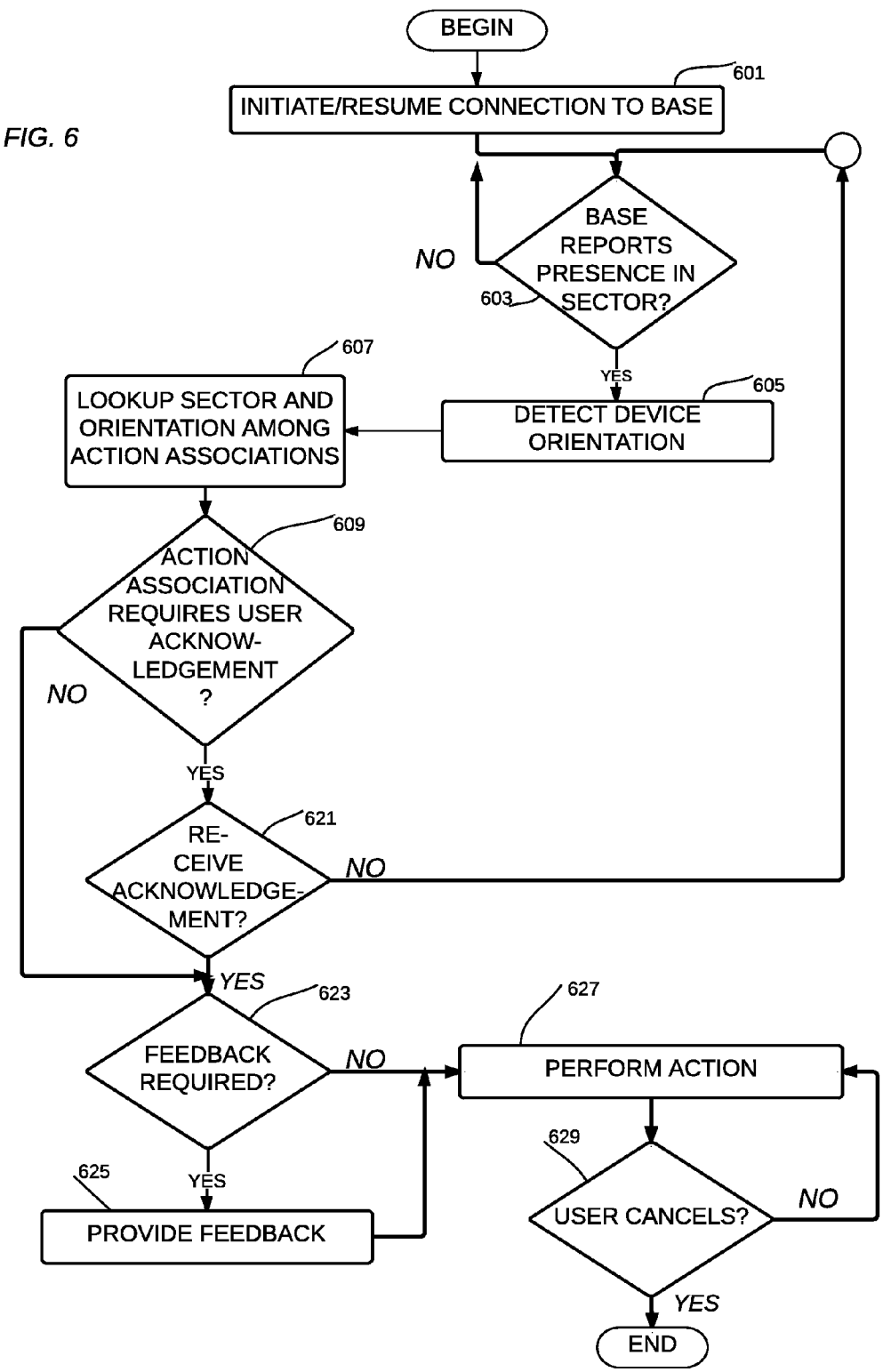
FIG. 6 is a flowchart showing mobile device cooperation to base unit and responsive mobile device actions in accordance with an illustrative embodiment of the invention.

FIG. 6 is a flowchart showing mobile device cooperation to base unit and responsive mobile device actions in accordance with an illustrative embodiment of the invention. Initially, the mobile device may initiate or resume connection to a base (step 601). Connection, as used herein, indicates that the base is nearby, and can include partial information that is received intermittently, for example, at the edge of a transmission cell. Next, the mobile device may determine whether the base reports a mobile device presence in the a sector (step 603). Step 603 can involve the mobile device receiving a signal that the mobile device, itself, is present in the sector. While the mobile device does not determine that the base reports, the mobile device can repeatedly perform step 603. In response to determining that the base reports the mobile device presence, the mobile device can detect the mobile device's orientation (step 605).

Next, the mobile device may lookup the sector and orientation among action associations (step 607). Step 607 may be performed by referencing data entered to a data store. Such a data store can be collected by a user interface as described in FIG. 4, modified to additionally collect data relating to distinguishable orientations. Step 607 may obtain an action associated with the sector and orientation.

Next, the mobile device may determine if the action association requires a user acknowledgement (step 609). If the action association requires a user acknowledgement, the mobile device can determine if it received a user acknowledgement (step 621). If no acknowledgement is received, for example, within a preset time, processing may resume at step 603.

However, if an acknowledgement is received, or after the mobile device determines no user acknowledgement is required, the mobile device may determine if feedback is required (step 623). If so, the mobile device can provide feedback (step 625). Feedback can be a displayed summary of progress. Feedback can be an audible indication of progress. Next, or after a determination that no feedback is required, the mobile device can perform the action (step 627). The mobile device can perform the action as looked up from the data store. The action can be substantive data exchange, for example, with a networked device. The action can be rendering media concurrent to a media file upload. "Concurrent to the media file upload", can be seconds prior to beginning transmission of the media file. Many nuanced versions of the action can be expressed by the user. Next, the mobile device can determine if the user cancels the action (step 629). If the user does not cancel, the mobile device continues to perform the action at step 627. However, if the user cancels, processing may terminate thereafter.

The base, in response to step 627 performed in whole or in part at the mobile device, can receive data from the mobile device. The base may optionally further propagate the data to additional devices in a network, for example, an end node or cloud service, explained below.

Many forms of actions are within the scope of step 627. For example, the action can include direct upload to the base, starting and closing applications on the mobile device, renewing subscriptions, pulling or pushing analytics and reports, validating access control lists, and the like. The mobile device can render data concurrent to a data file upload or syncing. In addition, the base can operate as a routing device to further propagate data received from the mobile device in part, or in total form, to a cloud service. A cloud service is any network service provided to the authorized devices through the use of a data network. The end node, which provides storage or further data processing as the cloud service, can be a data processing system such as data processing system 100 of FIG. 1. As such, the end node can provide more permanent, and potentially robust storage and handling of the data files, for example data files synced from the mobile device. Thus, the cloud service is the service and/or supporting end node.

It is further appreciated, that activities of FIG. 6 can be performed entirely on the mobile device, on the base, or on a combination of the mobile device and base. As an example of an alternate illustrative embodiment, step 621 can be performed by a user operating a button or other sensor on the base.

The illustrative embodiments permit a user to place a mobile device in proximity to a base, generally within view of the mobile device. Such an arrangement permits the user to consciously consider the effect of mere placement of a device in a manner more deliberate than, for example, merely arriving at an address while walking, driving, etc. Unlike geofencing, specific stances can be taken into account to activate actions that can become routine. Moreover, for example, responsive to a user arriving home, or business, where she may normally drop a mobile device into a stationary position, the user can activate such actions without even glancing at the mobile device, at least if the user previously configures such an action.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can store the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for activating mobile device activity, the method comprising:
receiving a user-specification of an action associated with at least one stance, wherein the stance comprises a mobile device's presence within a single sector of a base among at least four sectors, each sector substantially co-equal in size, and a specific orientation of the mobile device with respect to a force of gravity, among two opposing orientations and wherein the single base comprises a plurality of antennas, wherein the two opposing orientations are selected from among the group consisting of upright and inverted, wherein upright is the mobile device having a ray extend from a center of gravity through a mobile device feature such that the ray is within a tolerance of an opposite direction of gravity, and wherein inverted is the mobile device having the ray within a tolerance of the direction of gravity;
receiving a user identification of the base wherein a user provides the identity of the base with which to coordinate;
wherein receiving the user-specification of the action association further comprises:
receiving a user login;
receiving service resolution parameters; and
receiving a user password;
receiving a signal that the mobile device is present in the single sector, less than 10 meters from any of the plurality of antennas;
responsive to receiving the signal, rendering a prompt requesting confirmation by the user, to transfer of a media file;
receiving an acknowledgment from the user to transfer the media file, based on the prompt; and
performing the action as a media file transfer to or from the mobile device provided the mobile device is within 10 meters of the base and indicating transfer status of the media file transfer to the user, responsive to receiving the acknowledgment from the user to transfer the media file.

2. The method of claim 1, wherein the action comprises communicating to a cloud service other than the base.

3. The method of claim 1, wherein the action comprises changing an availability of at least one application.

4. The method of claim 1, wherein the action further comprises rendering data concurrent to the media file transfer.

5. The method of claim 4, wherein concurrent to the media file transfer, is seconds prior to beginning the media file transfer.

6. The method of claim 5, wherein beginning the media file transfer discriminates among files based on a tag associated with the media file.

\* \* \* \* \*